United States Patent [19]

Lankford, Jr.

[11] 4,134,099
[45] Jan. 9, 1979

[54] SYSTEM FOR LAND SEISMIC CABLE FAULT LOCATION

[75] Inventor: Frank L. Lankford, Jr., Bellaire, Tex.

[73] Assignee: Texaco Inc., New York, N.Y.

[21] Appl. No.: 787,717

[22] Filed: Apr. 15, 1977

[51] Int. Cl.² ........................... G01V 1/24; G01V 1/22
[52] U.S. Cl. ............................... 340/15.5 TS; 340/514; 324/51; 179/175.3 F
[58] Field of Search ................ 340/15.5 TS, 214, 411, 340/253 B; 324/51; 179/175.3 F

[56] References Cited

U.S. PATENT DOCUMENTS

| | | | |
|---|---|---|---|
| 334,969 | 1/1886 | Milliken | 340/411 |
| 1,977,707 | 10/1934 | Waitzer | 324/73 |
| 3,105,883 | 10/1963 | Higson | 179/175.3 F |
| 3,360,617 | 12/1967 | Munson | 179/175.3 F |
| 3,916,371 | 10/1975 | Broding | 340/15.5 TS |
| 4,010,442 | 3/1977 | Broding | 340/15.5 TS |
| 4,052,694 | 10/1977 | Fredriksson | 179/175.3 F |

*Primary Examiner*—Nelson Moskowitz
*Attorney, Agent, or Firm*—Thomas H. Whaley; Carl G. Ries; Henry C. Dearborn

[57] ABSTRACT

A system for locating discontinuities in land seismic geophone cables, which cables have plural sections with electrical connectors at the ends of each section. One of the connectors of each section has a relay incorporated with it, and includes a circuit for connecting a short circuit between all of the plural geophone circuit conductors. The short circuit connection is made when the relay is actuated, and the relay is actuated upon command from a recording station.

1 Claim, 4 Drawing Figures

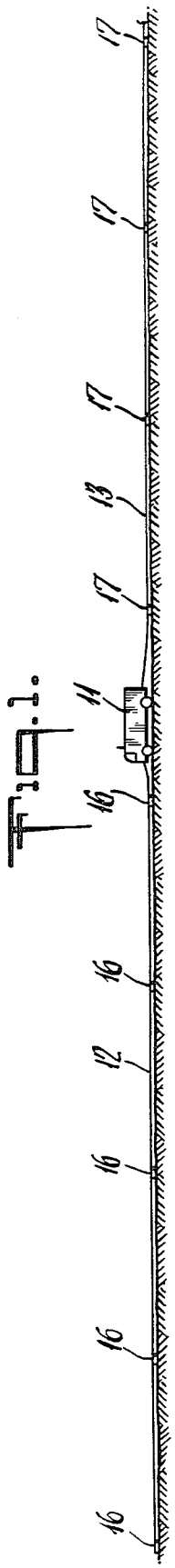
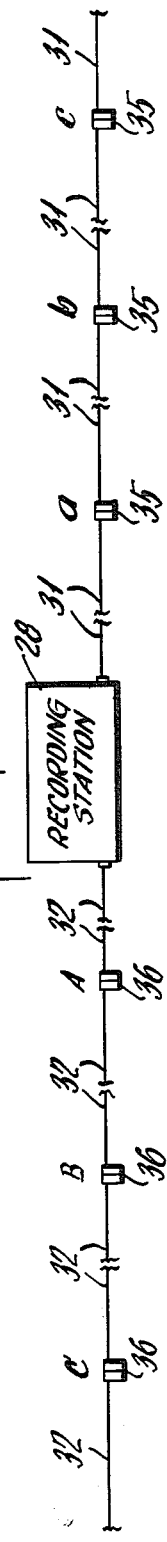
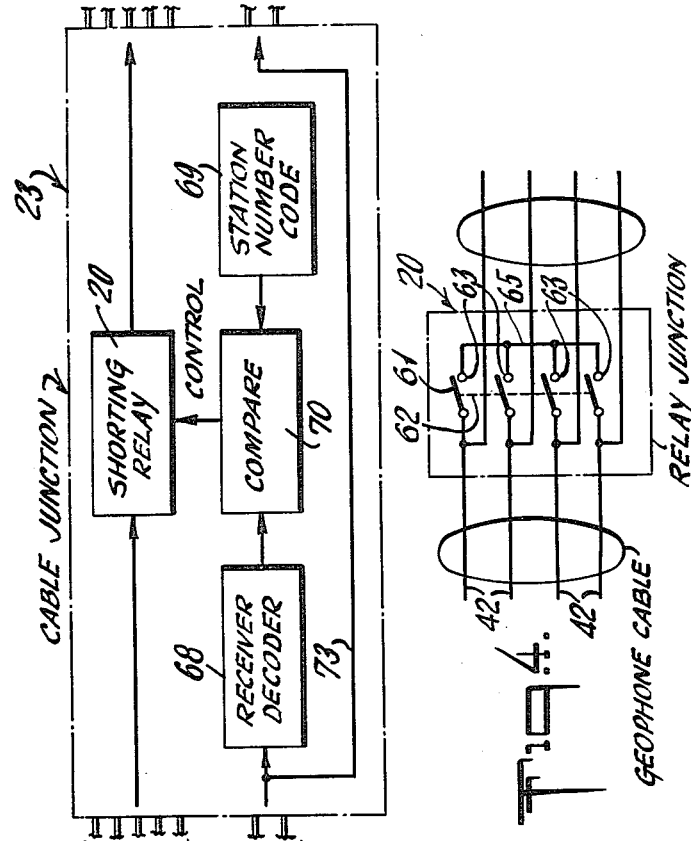
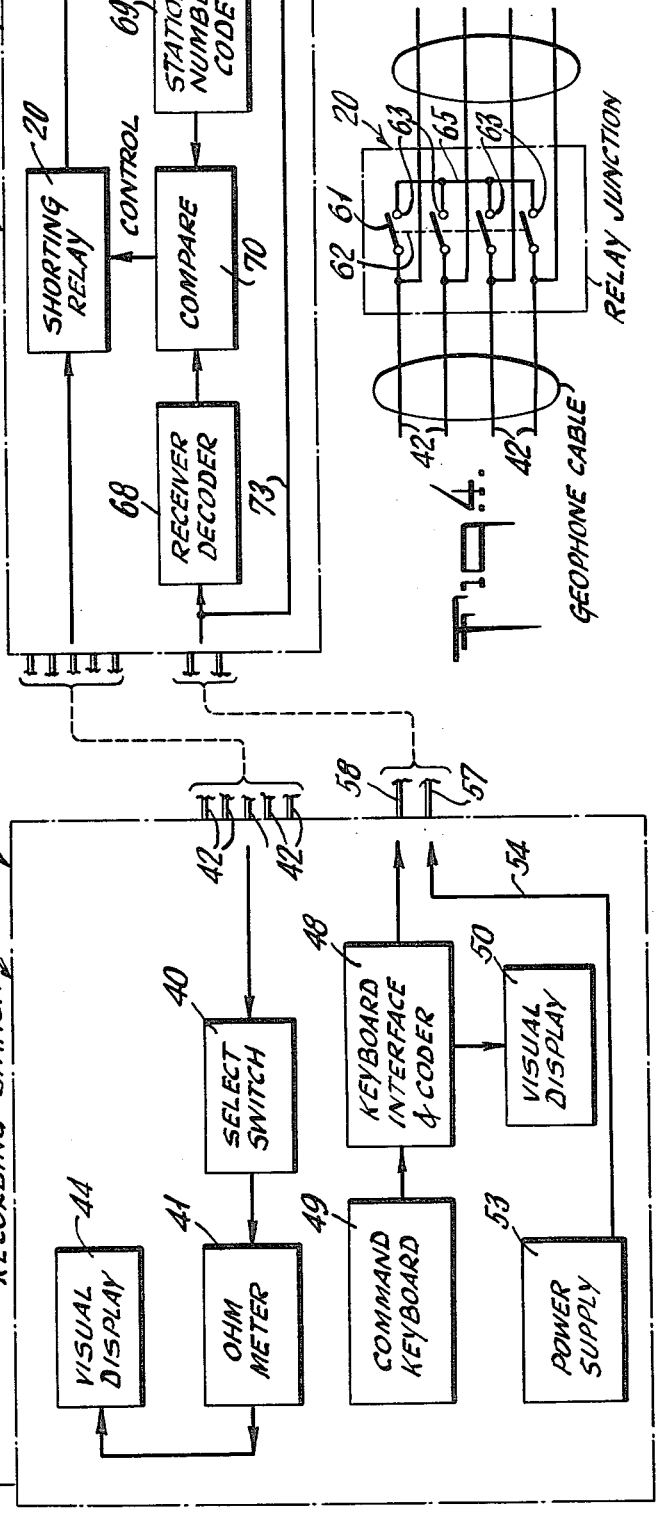

SYSTEM FOR LAND SEISMIC CABLE FAULT LOCATION

BACKGROUND OF THE INVENTION

1. Field of the Invention

This invention concerns land type seismic exploration, in general, and more particularly concerns a system for locating discontinuities in the seismic cables.

2. Description of the Prior Art

In typical land seismic exploration operations today, the equipment employed uses multiple conductor cables that are extremely long. When they are spread out along the surface of the earth, they will extend for several thousand meters from end to end. The cables which are employed are constructed in sections for portability, and the sections are terminated using electrical connectors. It has been found that during use in the field operations, there are discontinuities in the cables which would develop due to such things as rodents and live stock bites, as well as vandalism and vehicle traffic, in addition to old age of the cables.

Since a seismic field operation involves a number of personnel that are skilled and professional workers, the cost of making seismic surveys is quite high. Consequently, it is important to have the operation continue with dispatch, and to minimize the idle time caused by misfunction such as discontinuities in the cable of the type just mentioned. In the past, it has been necessary for a worker to walk along the cable and carry a radio for communication with the recording station. Then, an intentional short circuit would be made while the circuits were monitored from the recording station, in order to locate the position of a discontinuity.

Consequently, it is an object of this invention to provide a system whereby a short circuiting relay is located at each of the terminal connectors and control is maintained from the recording station, in order to actuate these relays in a predetermined manner for quickly locating any discontinuity.

SUMMARY OF THE INVENTION

Briefly, the invention is in combination with land seismic geophone cables wherein said cables comprise long sections of multi-geophone circuit conductors with electrical connectors at the ends thereof. A plurality of said cable sections are spread out on both sides of a recording station when they are in use. The improvement comprises a relay located at one of said electrical connectors on each of said long cable sections, the said relay having a multi-pole single-throw switch. It also comprises circuit means at said relay location for short circuiting all of said multi-circuit conductors when said relay is actuated, and electronic means for actuating said relay upon command from said recording station.

Again briefly, the invention is in combination with land seismic geophone cables wherein said cables comprise long sections of multi-geophone circuit conductors with electrical connectors at the ends thereof, and a plurality of said sections are spread out on both sides of a recording station when in use. The invention concerns the improvement that comprises a relay located at one of said electrical connectors on each of said long cable sections, the said relay having a multi-pole single-throw switch. It also comprises first circuit means at said relay location for short circuiting all of said multi-circuit conductors when said relay is actuated, and command signal means at said recording station which comprises a keyboard for selecting a predetermined number to be coded for corresponding to a predetermined one of said relays, and interface means for translating said number into a coded signal. The improvement also comprises second circuit means comprising two of said geophone circuit conductors for transmitting said coded signal to said relays and for supplying power to said relay locations, and electronic means for actuating each of said relays upon receipt of said corresponding coded signal. The electronic means comprises code means for identifying said predetermined relay, and means for comparing said coded signal with said code means.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic illustration of a land seismic geophone cable spread, extending on either side of a recording truck;

FIG. 2 is a schematic representation of the cable sections and connectors therebetween, that are employed in the layout according to FIG. 1;

FIG. 3 is a schematic block-type circuit diagram illustrating the circuits and elements employed in the equipment for carrying out the invention; and FIG. 4 is a schematic circuit diagram illustrating a relay and circuits for control of short circuiting, in accordance with the invention.

DESCRIPTION OF THE PREFERRED EMBODIMENT

FIG. 1 illustrates a typical land seismic geophone spread. It involves the use of a recording truck 11, to which geophone cables 12 and 13 are connected following their being spread out across the surface of the earth, in the manner indicated. It will be understood that these cables are made up in sections with electrical connectors 16 and 17 at the ends of these sections, so that the entire spread may extend for thousands of meters.

In order to avoid the time consuming procedure of having a worker walk along the spread in order to make a determination as to the location of a discontinuity, the electrical connectors 16 and 17 on the ends of the cable sections include a multi-pole single-throw relay 20. Such a relay 20, along with electronic controls therefor, is located in one of the connectors for each cable section. Such relay 20 is illustrated schematically by a dashed-line box shown in FIG. 4.

Since one of the connectors 16 and/or 17 at each end of the cable sections of the cables 12 and 13 must be actuated individually and in a known manner, each such individual connector includes a group of control elements to determine actuation of the relay 20. These control elements are illustrated in FIG. 3 where a dashed-line box 23 carries the caption "cable junction". This represents one of the connectors with its relay 20 and control elements incorporated therein.

FIG. 2 schematically indicates the physical lay-out in FIG. 1, for the purpose of describing the system and its operation. Thus, there is illustrated schematically a recording station 28 which is ordinarily incorporated in a vehicle, such as the seismic truck 11 indicated in FIG. 1.

When the cables are spread out there are a plurality of sections 31 on one side of the station 28 and sections 32 on the other. In accordance with the indications above, these sections 31 and 32 have connectors 35 and 36 respectively, for making electrical connections at the ends of the cable sections.

FIG. 3 illustrates the elements of an electronic system which is employed for carrying out the desired actuation of individual shorting relays 20. Such actuation is carried out in order to make a determination of the location of a discontinuity when one has been discovered. The conventional equipment at a recording station, such as the station 28 illustrated, includes a selection switch 40 for connecting an ohmmeter 41 to individual ones of a plurality of geophone circuit wires 42. This is done in order to determine the condition of the individual geophone circuits, and thus whether or not a discontinuity exists. The ohmmeter 41 may, of course, have a visual display element 44 as is indicated by the caption.

In order to carry out a determination in accordance with this invention, the recording station 28 includes a keyboard interfacer and coder 48 and a command keyboard 49. The keyboard 49 is electrically connected to the coder 48 so that by manipulating the keyboard 49 a particular coded signal may be sent for actuating the desired one of the relays 20 in order to make a determination concerning discontinuity for that particular section of the cables 31 or 32. It will be understood that there may be a visual display element 50 connected with the coder 48, for visual verification of the selected relay.

Also, there is a power supply 53 that is connected to all of the cable junction boxes 23 via a circuit connection 54. The power circuit goes over one of a pair of spare geophone wires 57 and 58 to the various junction boxes 23.

FIG. 4 illustrates a circuit detail that is included in each of the connection boxes 23. There are circuit connections from all of the geophone wires 42 to a corresponding number of multi-poles 61 of a multi-pole single-throw relay switch 62. The multi-poles 61 of the relay switch 62 make contact with a corresponding plurality of switch contacts 63 when the relay switch 62 is actuated. There is a common circuit connection 65 that goes between all of the switch contacts 63 so that whenever the relay switch 62 is actuated there is a short circuit connection from one to the other of all of the circuit wires for the various geophone circuits.

At each connector box 23 there is a receiver decoder 68 and a station number code element 69 with a circuit element 70 connected therebetween for comparing the receiver decoder output with the station number codes. It may be noted that the power supply circuit connection 54 is carried over the wire 57 which circuit is continued through each cable junction box 23 via a circuit connection 73 indicated.

OPERATION

When a discontinuity has been found in the course of testing the geophone circuits, it may not be obvious which section of the geophone cable has the discontinuity that is indicated. Consequently a determination may be made quickly and positively by manually putting into the command keyboard 49 a code to actuate a predetermined one of the relays 20. Then if the discontinuity still exists, it is an indication that the break is closer to the recording station from that relay 20 which was actuated. Therefore, the next closer relay 20 will be actuated until the short circuit indication appears. Then the section of cable where the discontinuity exists will be clearly identified.

It will be clear to anyone skilled in the art that the electronic elements shown and described in the various parts of the system, e.g. the elements shown in block diagram form at the recording station 28 and at each of the cable junctions 23, might take various individual forms. Thus, the command keyboard 49 may be a plurality of key operated switches (not shown) which will allow the operator to enter the multi-digit number that describes a unique cable junction 23. The keyboard interface and coder 48 may be a known type of circuit which will then generate a width modulated pulse train that is transmitted over the circuit wire 58 to all of the cable junctions 23. The particular junction 23 which has that code number already fixed in its station number code element 69, will react and so actuate its relay 20.

It will be understood that the various electronic circuit elements may be different ones of available integrated circuits that are commercially marketed. The interconnection for carrying out the desired functions will be readily apparent to any one skilled in the art.

While a particular embodiment of the invention has been described above in considerable detail, this is not to be taken as in any way limiting the invention but merely as being descriptive thereof.

I claim:

1. In combination with land seismic geophone cables wherein said cables comprise long sections of multi-geophone circuit conductors with electrical connectors at the ends thereof, a plurality of said sections being spread out on both sides of a recording station when in use, the improvement comprising
    a relay located at one of said electrical connectors on each of said long cable sections,
    said relay having a multi-pole single-throw switch,
    first circuit means at said relay location for short circuiting all of said multi-circuit conductors when said relay is actuated,
    command signal means at said recording station comprising
    a keyboard for selecting a predetermined number to be coded for corresponding to a predetermined one of said relays, and
    second circuit means comprising two of said geophone circuit conductors for transmitting said coded signal to said relays and for supplying power to said relay locations,
    electronic means for actuating each of said relays upon receipt of said corresponding coded signal, comprising
    code means for identifying said predetermined relay, and
    means for comparing said coded signal with said code means.

* * * * *